(12) United States Patent
Tecza

(10) Patent No.: US 8,408,806 B2
(45) Date of Patent: Apr. 2, 2013

(54) AUXILIARY BEARING SYSTEM WITH OIL RING FOR MAGNETICALLY SUPPORTED ROTOR SYSTEM

(75) Inventor: Joseph A. Tecza, Scio, NY (US)

(73) Assignee: Dresser-Rand Company, Olean, NY (US)

( * ) Notice: Subject to any disclaimer, the term of this patent is extended or adjusted under 35 U.S.C. 154(b) by 104 days.

(21) Appl. No.: 12/900,606

(22) Filed: Oct. 8, 2010

(65) Prior Publication Data

US 2011/0085753 A1 Apr. 14, 2011

Related U.S. Application Data

(60) Provisional application No. 61/250,346, filed on Oct. 9, 2009.

(51) Int. Cl.
*F16C 19/00* (2006.01)
*F16C 1/24* (2006.01)

(52) U.S. Cl. .......................................... 384/462; 384/405

(58) Field of Classification Search .......... 384/404–407, 384/462, 465, 467, 471, 473; 184/6.16, 11.1, 184/13.1
See application file for complete search history.

(56) References Cited

U.S. PATENT DOCUMENTS

| | | | |
|---|---|---|---|
| 1,908,379 A * | 5/1933 | Todd | 384/406 |
| 2,231,323 A | 2/1941 | Cawood | |
| 2,335,557 A * | 11/1943 | Winther | 384/406 |
| 3,295,801 A | 1/1967 | McDowall et al. | |
| 3,630,586 A | 12/1971 | Pitner | |
| 3,683,734 A | 8/1972 | Claussen | |
| 3,827,337 A | 8/1974 | Pruvot | |
| 3,947,153 A | 3/1976 | Matthias et al. | |
| 4,063,786 A | 12/1977 | Rall | |
| 4,128,280 A | 12/1978 | Purtschert | |
| 4,141,604 A | 2/1979 | Habermann et al. | |
| 4,213,661 A | 7/1980 | Marmol | |
| 4,460,283 A | 7/1984 | Yoshioka et al. | |
| 4,526,483 A | 7/1985 | Hishikawa et al. | |
| 4,542,994 A | 9/1985 | Mohsin | |
| 4,545,586 A | 10/1985 | von Pragenau | |
| 4,553,855 A | 11/1985 | De Choudhury | |
| 4,597,676 A | 7/1986 | Vohr et al. | |
| 4,597,679 A * | 7/1986 | Wlodkowski | 384/462 |
| 4,619,535 A * | 10/1986 | Haugwitz | 384/472 |
| 4,657,414 A | 4/1987 | Stella | |

(Continued)

FOREIGN PATENT DOCUMENTS

JP 08-082397 A 3/1996
JP 2001-124062 A 5/2001

(Continued)

OTHER PUBLICATIONS

PCT/US2010/051922 International Search Report and Written Opinion dated Jun. 30, 2011 (8 pages).

(Continued)

*Primary Examiner* — James Pilkington
(74) *Attorney, Agent, or Firm* — Edmonds & Nolte, PC

(57) ABSTRACT

An auxiliary bearing system having a sleeve through which a shaft extends. A gap may be defined between the sleeve and the shaft when a primary bearing system supports the shaft, and the sleeve may engage and rotate with the shaft when the primary bearing system does not support the shaft. An oil ring may extend circumferentially around the sleeve and rotate in response to the rotating sleeve when the sleeve engages and rotates with the shaft. The rotating oil ring may distribute lubricant within the auxiliary bearing system.

20 Claims, 4 Drawing Sheets

U.S. PATENT DOCUMENTS

| | | | |
|---|---|---|---|
| 4,683,111 | A | 7/1987 | Helm et al. |
| 4,827,169 | A | 5/1989 | Habermann |
| 4,872,767 | A | 10/1989 | Knapp |
| 4,929,158 | A | 5/1990 | Girault |
| 4,982,126 | A | 1/1991 | Jolivet et al. |
| 5,021,697 | A | 6/1991 | Kralick |
| 5,083,053 | A | 1/1992 | New |
| 5,126,612 | A | 6/1992 | Girault |
| 5,231,323 | A | 7/1993 | New |
| 5,272,403 | A * | 12/1993 | New .............................. 384/102 |
| 5,341,527 | A | 8/1994 | Schmidt et al. |
| 5,347,190 | A | 9/1994 | Lewis et al. |
| 5,355,040 | A | 10/1994 | New |
| 5,425,584 | A | 6/1995 | Ide |
| 5,521,448 | A | 5/1996 | Tecza et al. |
| 5,547,287 | A | 8/1996 | Zeidan |
| 5,616,976 | A | 4/1997 | Fremerey et al. |
| 5,630,881 | A | 5/1997 | Ogure et al. |
| 5,669,717 | A * | 9/1997 | Kostrzewsky ................ 384/144 |
| 5,693,994 | A | 12/1997 | New |
| 5,714,818 | A | 2/1998 | Eakman et al. |
| 5,749,700 | A | 5/1998 | Henry et al. |
| 5,752,774 | A | 5/1998 | Heshmat et al. |
| 5,803,612 | A | 9/1998 | Battig |
| 5,810,485 | A | 9/1998 | Dublin, Jr. et al. |
| 5,977,677 | A | 11/1999 | Henry et al. |
| 6,036,435 | A | 3/2000 | Oklejas |
| 6,078,120 | A | 6/2000 | Casaro et al. |
| 6,155,720 | A | 12/2000 | Battig |
| 6,194,801 | B1 | 2/2001 | Goransson |
| 6,196,809 | B1 | 3/2001 | Takahashi et al. |
| 6,244,749 | B1 | 6/2001 | Nakagawa et al. |
| 6,309,174 | B1 | 10/2001 | Oklejas, Jr. et al. |
| 6,310,414 | B1 | 10/2001 | Agahi et al. |
| 6,353,273 | B1 | 3/2002 | Heshmat et al. |
| 6,402,385 | B1 | 6/2002 | Hayakawa et al. |
| 6,770,993 | B1 | 8/2004 | Heshmat et al. |
| 6,846,158 | B2 | 1/2005 | Hull |
| 6,987,339 | B2 | 1/2006 | Adams et al. |
| 7,240,583 | B2 | 7/2007 | Wingett et al. |
| 7,264,430 | B2 | 9/2007 | Bischof et al. |
| 7,367,713 | B2 | 5/2008 | Swann et al. |
| 7,429,811 | B2 | 9/2008 | Palazzolo et al. |
| 7,694,540 | B2 | 4/2010 | Ishida et al. |
| 7,836,601 | B2 | 11/2010 | El-Shafei |
| 2004/0047526 | A1 | 3/2004 | DeWachter |
| 2004/0189124 | A1 | 9/2004 | Baudelocque et al. |
| 2006/0204153 | A1 | 9/2006 | Alam et al. |
| 2007/0036476 | A1 | 2/2007 | Lane et al. |
| 2009/0302698 | A1 | 12/2009 | Menz et al. |
| 2010/0021095 | A1 | 1/2010 | Maier |
| 2011/0052109 | A1 | 3/2011 | Tecza et al. |

FOREIGN PATENT DOCUMENTS

| | | |
|---|---|---|
| KR | 10-1989-0010437 A | 8/1989 |
| KR | 10-0207986 B1 | 7/1999 |
| WO | 91-17367 | 11/1991 |
| WO | 01-57408 A1 | 8/2000 |
| WO | 2006-098806 A1 | 9/2006 |
| WO | 2007-047976 A1 | 4/2007 |
| WO | 2011-044423 A1 | 4/2011 |
| WO | 2011-044428 A1 | 4/2011 |
| WO | 2011-044430 A1 | 4/2011 |
| WO | 2011-044432 A1 | 4/2011 |
| WO | 2011-088004 A1 | 7/2011 |

OTHER PUBLICATIONS

PCT/US2010/051927 International Search Report and Written Opinion dated Jun. 30, 2011 (8 pages).

Tecza and Walton, "A Chambered Porous Damper for Rotor Vibration Control: Part I—Concept Development" in The American Society of Mechanical Engineers, NY, 7 pages.

Walton and Martin, "A Chambered Porous Damper for Rotor Vibration Control: Part II—Imbalance Response and Bladeloss Simulation" in The American Society of Mechanical Engineers, NY, 7 pages.

PCT/US2010/051930 International Search Report and Written Opinion dated Jun. 30, 2011 (8 pages).

PCT/US2010/051932 International Search Report and Written Opinion dated Jun. 30, 2011 (8 pages).

PCT/US2010/020746 International Search Report and Written Opinion dated Sep. 23, 2011 (8 pages).

"Auxiliary Bearings in Vertically Oriented Machines on Magnetic Bearings," EPRI, Palo Alto, CA: 2001. 1003177.

Extended European search report for EP 06817242.8 dated Aug. 7, 2009, 3 pages.

Supplementary European search report for EP 06817242.8 dated Aug. 25, 2009, 1 page.

International Preliminary Report on Patentability for PCT/US2006/041127 dated Apr. 23, 2008, 4 pages.

Written Opinion of the International Searching Authority for PCT/US2006/041127 dated Mar. 19, 2007, 3 pages.

* cited by examiner

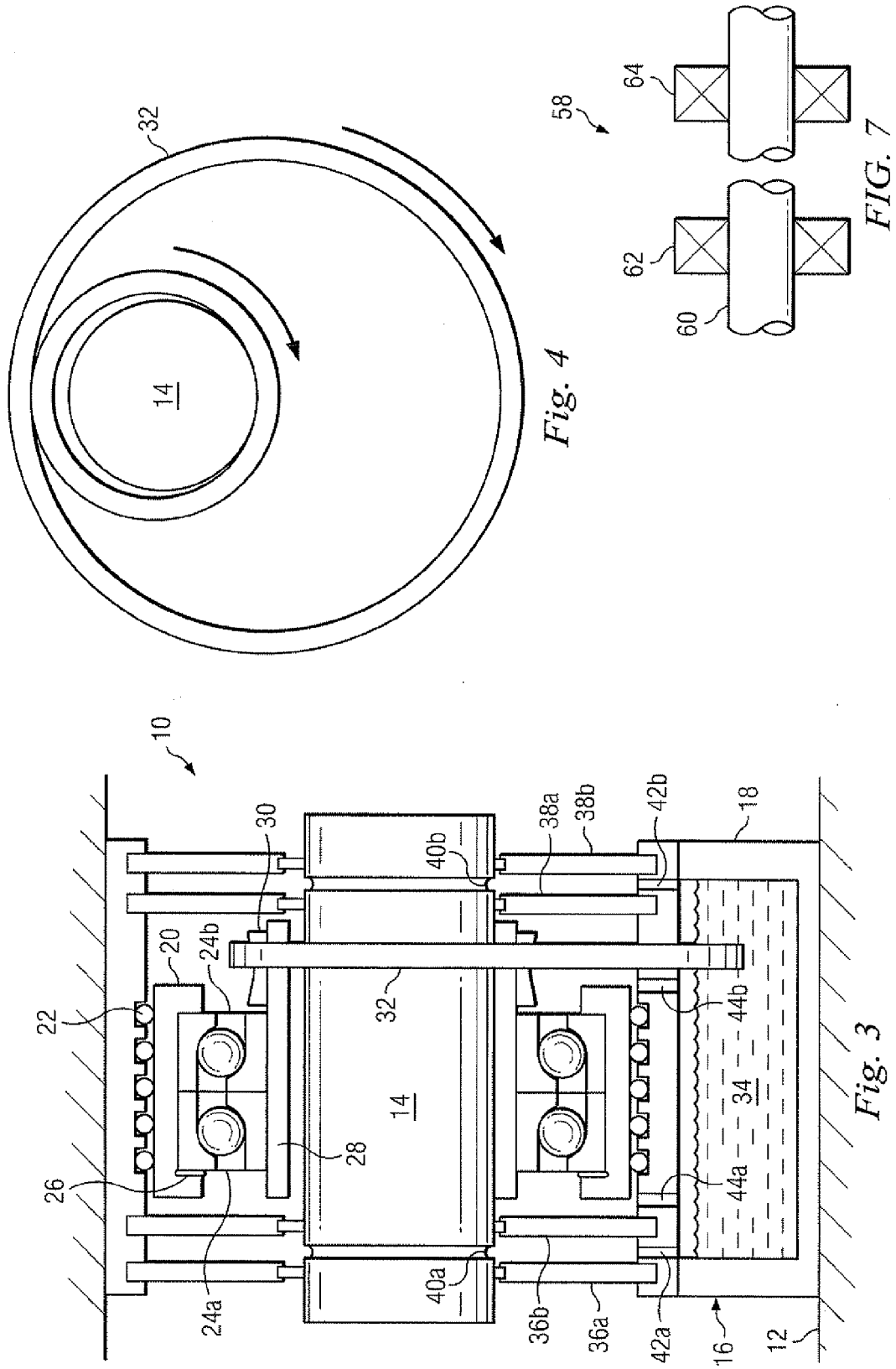

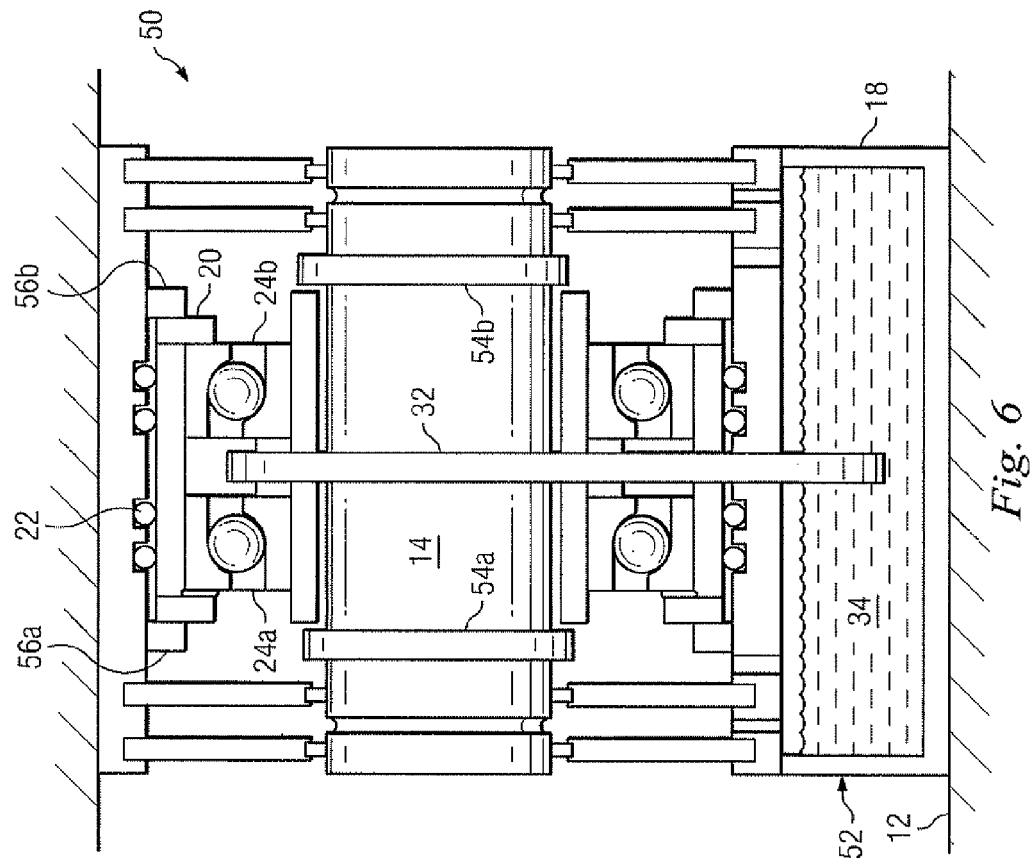
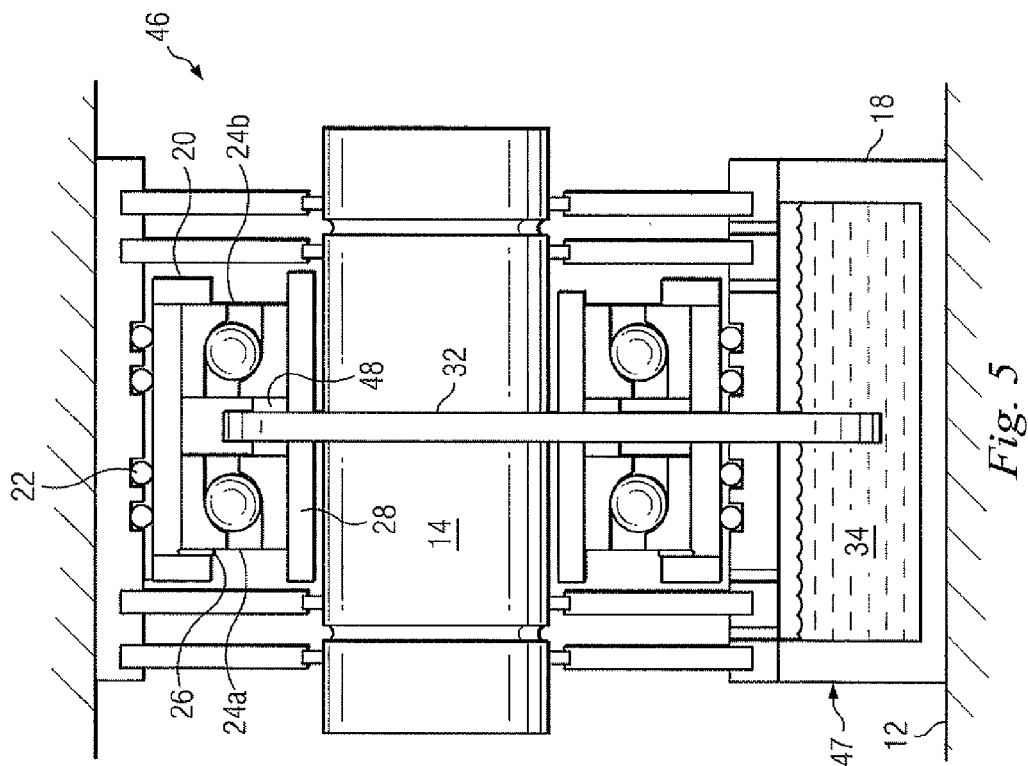

AUXILIARY BEARING SYSTEM WITH OIL RING FOR MAGNETICALLY SUPPORTED ROTOR SYSTEM

CROSS REFERENCE TO RELATED APPLICATIONS

This application claims priority to U.S. Patent Application Ser. No. 61/250,346, which was filed Oct. 9, 2009. This priority application is hereby incorporated by reference in its entirety into the present application, to the extent that it is not inconsistent with the present application.

BACKGROUND

This disclosure relates in general to auxiliary bearing systems, and in particular to an auxiliary bearing system for a magnetically supported rotor system. In turbomachine systems, if a primary bearing (such as a magnetic bearing) fails, the shaft of the turbomachine will generally fall or drop onto the adjacent mechanical surfaces. This drop often causes substantial damage to the shaft and/or the surrounding components. In turbomachine systems that include an auxiliary bearing, the shaft may drop onto the auxiliary bearing without damaging the shaft or the surrounding components.

When the rotating shaft drops, the auxiliary bearing system is subject to extreme accelerations which generate heat that limits the life of the auxiliary bearing system. To reduce the generated heat, lubrication is provided to the auxiliary bearing system. However, conventional lubrication systems do not provide adequate lubrication to the auxiliary bearing systems within a short time span. Therefore, what is needed is a system or configuration that overcomes these problems.

SUMMARY

Embodiments of the disclosure may provide an auxiliary bearing system having a sleeve through which a shaft extends. A gap may be defined between the sleeve and the shaft when a primary bearing system supports the shaft, and the sleeve may engage and rotate with the shaft when the primary bearing system does not support the shaft. An oil ring may extend circumferentially around the sleeve and rotate in response to the rotating sleeve when the sleeve engages and rotates with the shaft. The rotating oil ring may distribute lubricant within the auxiliary bearing system.

Embodiments of the disclosure may further provide a method of supporting a shaft. The method may include rotating a shaft, and supporting the shaft with a primary bearing system during normal operation. The shaft may be supported by an auxiliary bearing system when the primary bearing system is not supporting the shaft. When this occurs, the auxiliary bearing system may engage the shaft with a sleeve disposed circumferentially around the shaft, and the sleeve may rotate in response to the rotating shaft. An oil ring may rotate in response to the rotating sleeve, and the oil ring may be disposed circumferentially around the sleeve. The rotating oil ring may collect lubricant from a reservoir and distribute the lubricant within the auxiliary bearing system.

Embodiments of the disclosure may further provide a rotor system. The rotor system may include a rotating shaft. A first bearing system may be configured to support the shaft during normal operation of the rotor system. A second bearing system may be configured to support the shaft when the first bearing system is not supporting the shaft. The second bearing system may include a sleeve through which the shaft extends. A gap may be defined between the sleeve and the shaft when the first bearing system supports the shaft, and the sleeve may engage and rotate with the rotating shaft when the second bearing system supports the shaft. The second bearing system may also include an oil ring extending circumferentially around the sleeve and the shaft, and the oil ring may be configured to rotate in response to the rotation of the sleeve. The second bearing system may further include a lubricant-containing reservoir disposed below the shaft, and oil ring may be in contact with the lubricant in the reservoir and distribute the lubricant within the second bearing system when the oil ring rotates, thereby lubricating and cooling the second bearing system.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 3 is a view similar to that of FIG. 1 but depicting the rotor system of FIG. 1 in another operational configuration, that is, when the shaft is delevitated as opposed to levitated, according to an exemplary embodiment.

FIG. 4 is an elevational view of a portion of the rotor system of FIG. 3, the elevational view depicting the shaft and the oil ring, according to an exemplary embodiment.

FIG. 5 is a sectional view of another rotor system according to an exemplary embodiment, the rotor system including a shaft and another auxiliary bearing system, the auxiliary bearing system including an oil ring.

FIG. 6 is a sectional view of yet another rotor system according to an exemplary embodiment, the rotor system including a shaft and yet another auxiliary bearing system, the auxiliary bearing system including an oil ring.

FIG. 7 is a diagrammatic view of still yet another rotor system according to an exemplary embodiment.

DETAILED DESCRIPTION

Figure 2:
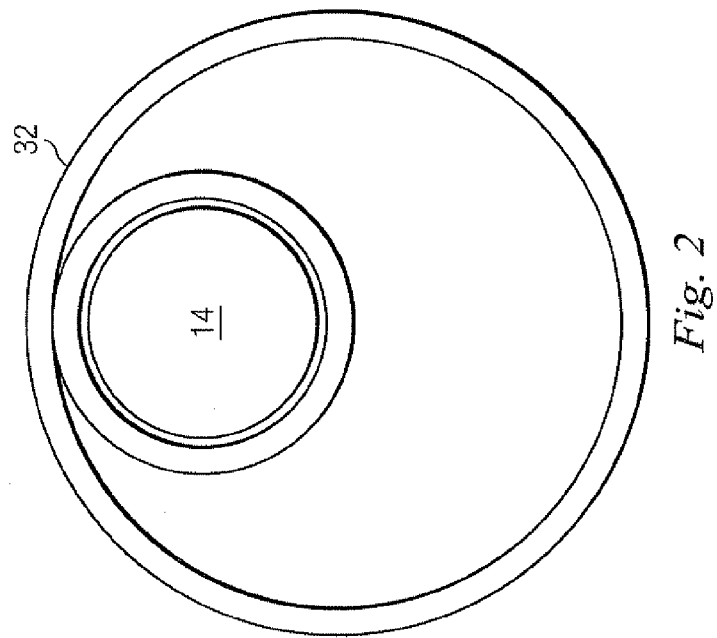
FIG. 2 is an elevational view of a portion of the rotor system of FIG. 1, the elevational view depicting the shaft and the oil ring, according to an exemplary embodiment.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope.

Figure 1:
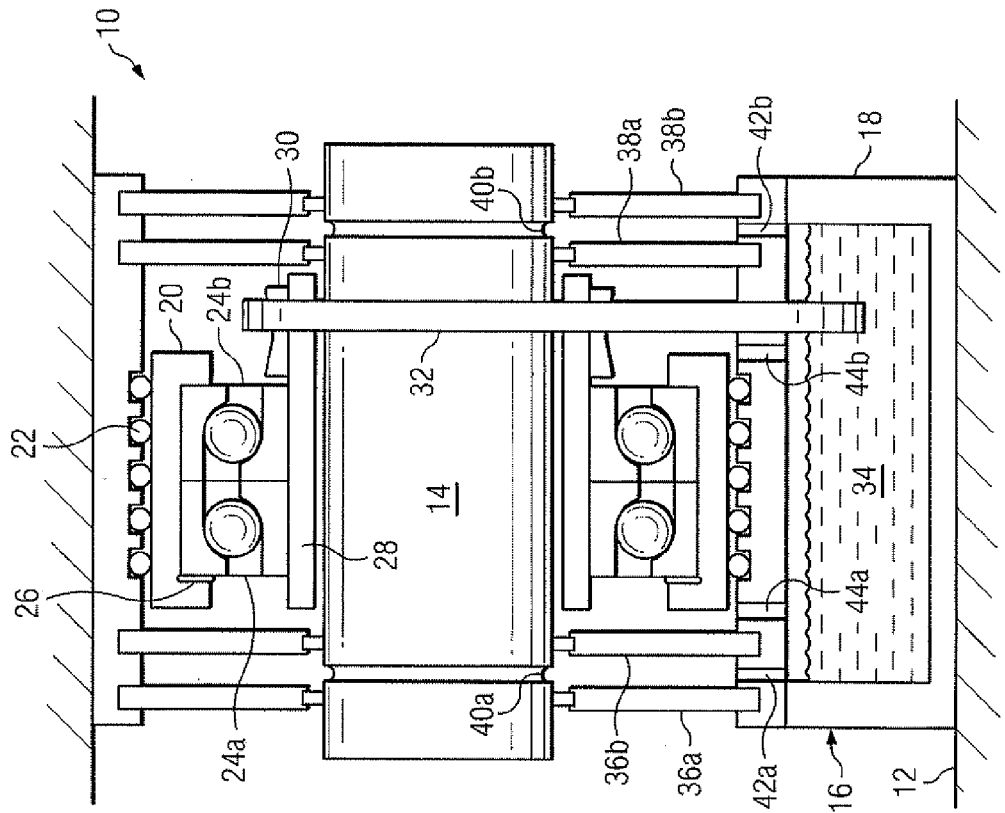
FIG. 1 is a sectional view of a rotor system according to an exemplary embodiment, the rotor system including a shaft and an auxiliary bearing system, the auxiliary bearing system including an oil ring.

In an exemplary embodiment, as illustrated in FIG. 1, a rotor system is generally referred to by the reference numeral 10 and includes a casing 12 and a shaft 14 disposed therein, the shaft 14 being normally supported by one or more active magnetic bearing systems (not shown) positioned at one or more axially-spaced locations along the shaft 14 including, but not limited to, opposing end portions of the shaft 14. In an exemplary embodiment, the shaft 14 incorporates a hardened landing sleeve. In several exemplary embodiments, the rotor system 10 includes, or is part of, a turbomachine such as, for example, a compressor, turbine, motor or generator.

An auxiliary bearing system 16 is mounted within the casing 12 via a bearing mount 18. A cartridge 20 is flexibly mounted to the bearing mount 18 via a compliant mount 22. As shown in FIG. 1, the compliant mount 22 includes a plurality of o-rings extending within annular grooves formed in the inside wall of the bearing mount 18 and engaging the outside surface of the cartridge 20. In several exemplary embodiments, instead of, or in addition to the plurality of o-rings, the compliant mount 22 includes a Borelli ribbon, a bump foil, a tolerance ring, a curved beam, a squirrel cage flexure arrangement, a squeeze film damper, and/or any combination thereof. In several exemplary embodiments, the Borelli ribbon may include a compliant ribbon-shaped structure, and the bump foil may include a foil having a series of uniform, axially-extending corrugations or bumps.

Angular contact rolling element bearings 24a and 24b are mounted within the cartridge 20 in a face-to-face arrangement with an axial preload, which is provided by a preload spring 26. The bearings 24a and 24b circumferentially extend about, and engage, the outside surface of a sleeve 28, through which the shaft 14 extends. In several exemplary embodiments, instead of, or in addition to the angular contact rolling element bearings 24a and 24b, a single row deep groove ball bearing, a double row deep groove ball bearing, other types of bearings, and/or any combination thereof, are mounted within the cartridge 20 and engage the outside surface of the sleeve 28.

As illustrated in FIGS. 1 and 2, a ring guide 30 circumferentially extends about, and engages, the outside surface of the sleeve 28. An oil ring 32 is positioned on the ring guide 30 and extends circumferentially about at least the shaft 14 and the ring guide 30. The oil ring 32 is not coaxial with either the shaft 14 or the ring guide 30. A reservoir 34 is formed within the lower portion of the bearing mount 18. The reservoir 34 is at least partially filled with a lubricant, and the lower portion of the oil ring 32 dips into the lubricant contained in the reservoir 34. In several exemplary embodiments, the lubricant contained in the reservoir 34 may include synthetic oils including polyalpha olefins and polyalkylene glycols (PAGs), mineral oil, gas turbine lubricants including polyphenyl ethers such as MIL-L-23699, MIL-PRF-23699 or MIL-L-7808, other oils with high pressure-viscosity coefficients, one or more lubricants with high pressure-viscosity coefficients, one or more mil-spec lubricants with high pressure-viscosity coefficients, and/or any combination thereof.

Oil seals 36a and 36b extend radially inward from the inside surface of the bearing mount 18 and sealingly engage the shaft 14 proximate to one end of the sleeve 28. Similarly, oil seals 38a and 38b extend radially inward from the inside surface of the bearing mount 18 and sealingly engage the shaft 14 proximate to the other end of the sleeve 28. In an exemplary embodiment, one or more of the oil seals 36a, 36b, 38a and 38b may include a suitable brush-type seal or other seal configured to accommodate shaft delevitation without damage. In several exemplary embodiments, instead of, or in addition to brush seals, the oil seals 36a, 36b, 38a and 38b include one or more lip seals, or other types of seals commonly used in turbomachines, and/or combinations thereof.

In an exemplary embodiment, in addition to the ring guide 30 and the oil ring 32, the auxiliary bearing system 16 may include an additional ring guide and oil ring, which are substantially similar to the ring guide 30 and the oil ring 32, respectively, and are axially positioned between the oil seal 36b and the bearing 24a. In an exemplary embodiment, instead of being axially positioned between the bearing 24b and the oil seal 38a, the ring guide 30 and the oil ring 32 may be axially positioned between the oil seal 36b and the bearing 24a.

Oil slingers 40a and 40b are formed in the shaft 14, with the oil slinger 40a being axially positioned between the seals 36a and 36b and the oil slinger 40b being axially positioned between the seals 38a and 38b. A drain passage 42a is formed in the lower portion of the bearing mount 18 at an axial position between the seals 36a and 36b, and a drain passage 42b is formed in the lower portion of the bearing mount 18 at an axial position between the seals 38a and 38b. Similarly, drain passages 44a and 44b are formed in the lower portion of the bearing mount 18 and are configured to drain oil that does not leak past the seals 36b and 38a back to the reservoir 34. The reservoir 34 is fluidically coupled to the interior of the casing 12 in the vicinity of the oil slingers 40a and 40b via the passages 42a and 42b, respectively, and by the drain passages 44a and 44b for the main auxiliary bearing cavity.

In operation, in an exemplary embodiment and referring to the configuration depicted in FIGS. 1 and 2, the shaft 14 rotates in place during the operation of the rotor system 10, and is normally supported by one or more active magnetic bearing systems positioned at one or more axially-spaced locations along the shaft 14 including, but not limited, opposing end portions of the shaft 14. During normal operation of the rotor system 10, that is, when the active magnetic bearing systems are supporting the shaft 14, the shaft 14 is levitated by the active magnetic bearing systems, and a radial clearance or gap is defined between the shaft 14 and the sleeve 28. During normal operation, the shaft 14 rotates relative to the sleeve 28, the ring guide 30, and the oil ring 32, all of which are generally stationary, i.e., they do not rotate or spin within the casing 12. The auxiliary bearing system 16 does not support the shaft 14 during normal operation of the rotor system 10.

Referring to the configuration depicted in FIGS. 3 and 4, in an exemplary embodiment, when one or more of the magnetic bearing systems, which support the shaft 14 during normal operation, fail, the shaft 14 delevitates, engaging or dropping onto the sleeve 28, at which point the auxiliary bearing system 16 begins to at least partially support the spinning shaft 14, with the bearings 24a and 24b and one or more other components of the auxiliary bearing system 16 being subjected to, and accommodating and supporting, at least a radial load. As a result of the shaft 14 engaging or catching on the sleeve 28, the sleeve 28 rotates or spins up, thereby causing the ring guide 30 and the oil ring 32 to rotate or spin up in place. As a result of its spinning, the oil ring 32 picks up lubricant in the reservoir 34 and continually feeds and distributes the lubricant within the auxiliary bearing system 16. The lubricant is distributed within the auxiliary bearing system 16 almost instantaneously when the shaft 14 drops, as the bearings 24a and 24b, the sleeve 28, the ring guide 30, and the oil ring 32 rapidly spin up to the rotational speed of the shaft 14.

As a result of the oil ring 32 picking up and distributing lubricant, the auxiliary bearing system 16, including the bearings 24a and 24b, is lubricated and cooled. In an exemplary embodiment, the reservoir 34 and the lubricant therein is cooled to remove heat. In an exemplary embodiment, the reservoir 34 and the lubricant therein is cooled to remove heat with, for example, a heat exchanger formed in one or more of the casing 12 and the bearing mount 18. Some of the lubricant may drain back to the reservoir 34 via the drain passages 42a, 42b, 44a and 44b and thus may be re-circulated through the auxiliary bearing system 16. The brush seals or other seals of the oil seals 36a, 36b, 38a and 38b accommodate the delevitation of the shaft 14, maintaining their respective sealing engagements with the shaft 14.

During the above-described operation of lubricant being carried by the oil ring 32, the auxiliary bearing system 16 is lubricated and cooled, thereby greatly extending the operating time of the auxiliary bearing system 16. The lubricant is distributed to the interface or contact zone between the shaft 14 and the sleeve 28, thereby lubricating and cooling the contact zone and extending the wear life of these components. In an exemplary embodiment, a hydrodynamic bearing is formed by the lubricant distributed by the oil ring 32 and disposed between the shaft 14 and the sleeve 28, that is, at the interface or contact zone between the shaft 14 and the sleeve 28.

As a result of the above-described rotor system 10 and its operation, including the auxiliary bearing system 16 and its operation, the auxiliary bearing system 16 has a built-in lubrication system that operates only when the auxiliary bearing system 16 and/or one or more components thereof is actively spinning and supporting the rotating shaft 14. The lubricant circulation during the operation of the auxiliary bearing system 16 is passive. The auxiliary bearing system 16 self-actuates during the drop of the shaft 14 or during a coastdown event. The use of liquid lubricant provides cooling as well as lubrication for the auxiliary bearing system 16 including the bearings 24a and 24b, and as a result, risks associated with thermal growths and overheating of the bearing elements are minimized. The auxiliary bearing system 16 is relatively small, self-contained, and can be installed within the overall rotor system 10.

In an exemplary embodiment, the auxiliary bearing system 16 is slow-rolled for a short period before each levitation of the shaft 14 and startup in order to distribute lubricant within the auxiliary bearing system 16. In an exemplary embodiment, for tolerance of spinups, the interface or contact zone between the shaft 14 and the sleeve 28 is coated with a dry lubricant that is compatible with the lubricant disposed in the reservoir 34. In an exemplary embodiment, a relatively small pool of lubricant is captured in the lower part of the cartridge 20 and left on at least the lower part of the respective outer races of the bearings 24a and 24b, thereby providing lubrication on spinup.

In an exemplary embodiment, the rotor system 10 is located in a relatively isolated area such as, for example, an offshore or a sub-sea installation. If the magnetic bearing system normally supporting the shaft 14 fails, the auxiliary bearing system 16 can accommodate or support the rotating or spinning shaft 14 for an extended period of time such as, for example, several days to three or four weeks, until the rotor system 10 is reached by repair crew and the magnetic bearing system is repaired and/or replaced (and, in some embodiments, until the auxiliary bearing system 16 and/or other components of the rotor system 10 are also repaired and/or replaced). In an exemplary embodiment, the auxiliary bearing system 16 can accommodate or support the rotating or spinning shaft at a reduced load for an extended period of time such as, for example, several days to three or four weeks.

In an exemplary embodiment, as illustrated in FIG. 5 with continuing reference to FIGS. 1-4, a rotor system is generally referred to by the reference numeral 46 and includes an auxiliary bearing system 47, which contains several parts of the auxiliary bearing system 16, which are given the same reference numerals. The auxiliary bearing system 47 is substantially similar to the auxiliary bearing system 16, except that the ring guide 30 is omitted in favor of a ring support or guide 48, which is axially disposed between the bearings 24a and 24b, which, as shown in FIG. 5, are axially spaced from one another. The oil ring 32 is positioned on the ring guide 48 and extends circumferentially about at least the shaft 14 and the ring guide 48. As shown in FIG. 5, the oil ring 32 is not coaxial with either the shaft 14 or the ring guide 48, and the lower portion of the oil ring 32 dips into the reservoir 34.

The operation of the rotor system 46, including the operation of its auxiliary bearing system 47, is substantially similar to the above-described operation of the rotor system 10, including the above-described operation of its auxiliary bearing system 16, and therefore the operation of the rotor system 46 and the auxiliary bearing system 47 will not be described in detail. In an exemplary embodiment, during the operation of the auxiliary bearing system 47, the oil ring 32 distributes lubricant in opposing axial directions, thereby lubricating and cooling, among other components of the rotor system 46 and the auxiliary bearing system 47, the axially-spaced bearings 24a and 24b.

In an exemplary embodiment, as illustrated in FIG. 6 with continuing reference to FIGS. 1-5, a rotor system is generally referred to by the reference numeral 50 and includes an auxiliary bearing system 52, which contains several parts of the auxiliary bearing system 47, which are given the same reference numerals. The auxiliary bearing system 52 includes annular shoulders 54a and 54b, which extend radially outward from the shaft 14. The shoulders 54a and 54b are axially located on the shaft 14 so that the sleeve 28 is positioned between the shoulders 54a and 54b, with the opposing end portions of the sleeve 28 being proximate to the shoulders 54a and 54b, respectively. Annular rings 56a and 56b are coupled to the circumferentially-extending inside surface of the bearing mount 18 so that the cartridge 20 is axially disposed between the rings 56a and 56b. The remainder of the auxiliary bearing system 52 is substantially similar to the auxiliary bearing system 47, and therefore the remainder of the auxiliary bearing system 52 will not be described in detail.

During the operation of the rotor system 50, in addition to accommodating and supporting at least a radial load in accordance with the foregoing, one or both of the shoulders 54a and 54b, and/or one or both of the annular rings 56a and 56b, of the auxiliary bearing system 52 accommodate and support axial thrusts or loads. For example, the shaft 14 may thrust axially toward the right, as viewed in FIG. 6, which causes the shoulder 54a to contact the sleeve 28, which, in turn, causes the cartridge 20 to contact the annular ring 56b, thereby accommodating and supporting the axial thrust. For another example, the shaft 14 may thrust axially toward the left, as viewed in FIG. 6, which axial thrust causes the shoulder 54b to contact the sleeve 28, which, in turn, causes the cartridge 20 to contact the annular ring 56a, thereby accommodating and supporting the axial thrust. The remainder of the operation of the rotor system 50, including the operation of its auxiliary bearing system 52, is substantially similar to the operation of the rotor system 46, including the operation of its auxiliary bearing system 47, and therefore the remainder of the operation of the rotor system 50 and the auxiliary bearing system 52 will not be described in detail.

In an exemplary embodiment, as illustrated in FIG. 7 with continuing reference to FIGS. 1-6, a rotor system is generally referred to by the reference numeral 58 and includes a shaft 60 and a magnetic bearing system 62, which is one of a plurality of magnetic bearing systems that normally support the shaft 60 and are positioned at axially-spaced locations along the shaft 60. The rotor system 58 further includes an auxiliary bearing system 64, which is one of a plurality of auxiliary bearing systems that are positioned at axially-spaced locations along the shaft 60. The auxiliary bearing system 64 supports the shaft 60 when the magnetic bearing system 62 fails. In several exemplary embodiments, the auxiliary bearing system 64 is the auxiliary bearing system 16, 47, or 52, as described above. In several exemplary embodiments, the rotor system 58 includes, or is part of, a turbomachine such as, for example, a compressor, turbine, motor or generator.

Figure 8:
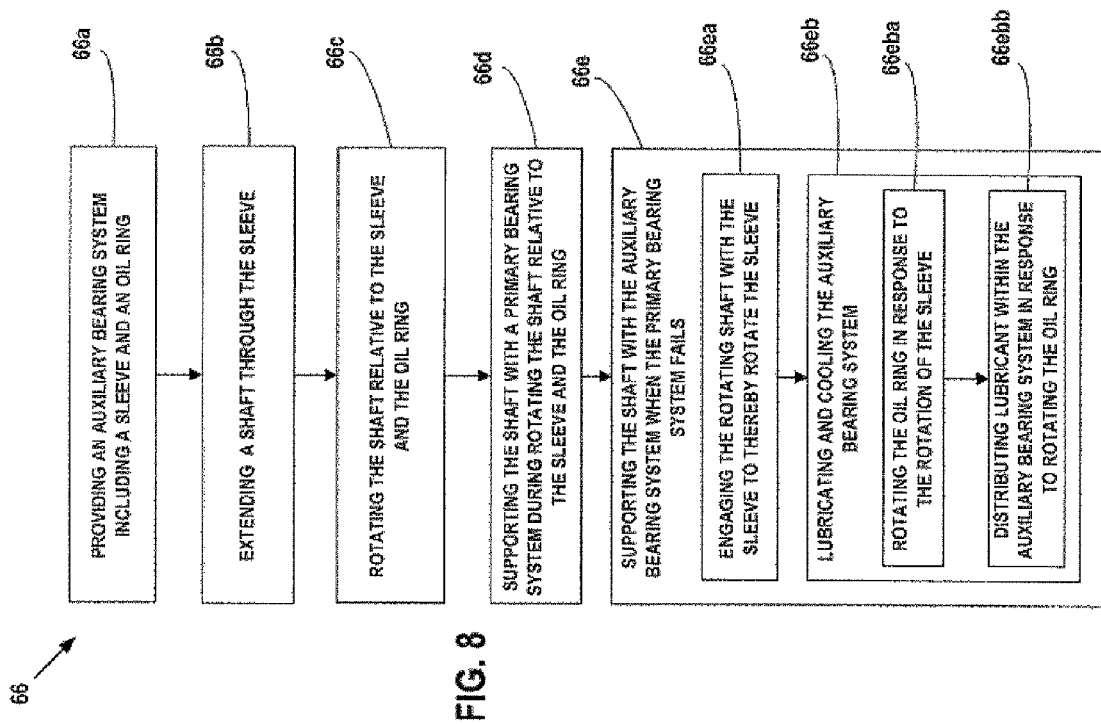
FIG. 8 is a flow chart illustration of a method of supporting a shaft, according to an exemplary embodiment.

In an exemplary embodiment, as illustrated in FIG. 8, a method of supporting a shaft is generally referred to by the reference numeral 66 and includes providing an auxiliary bearing system including a sleeve and an oil ring in step 66a; extending the shaft through the sleeve in step 66b; rotating the shaft relative to the sleeve and the oil ring in step 66c; supporting the shaft with a primary bearing system during rotating the shaft relative to the sleeve and the oil ring in step 66d; and supporting the shaft with the auxiliary bearing system when the primary bearing system fails in step 66e. The step 66e includes engaging the rotating shaft with the sleeve to thereby rotate the sleeve in step 66ea; and lubricating and cooling the auxiliary bearing system in step 66eb. The step 66eb includes rotating the oil ring in response to the rotation of the sleeve in step 66eba, and distributing lubricant within the auxiliary bearing system in response to rotating the oil ring in step 66ebb.

Although the present disclosure has described embodiments relating to specific turbomachinery, it is understood that the apparatus, systems and methods described herein could applied to other environments. For example, according to another exemplary embodiment, rotating machinery that is driven by a turbomachine may be configured to use embodiments of the auxiliary bearing systems described above.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An auxiliary bearing system, comprising:
a sleeve through which a rotating shaft extends, the shaft comprising a first slinger and a second slinger distal from the first slinger, wherein a gap is defined between the sleeve and the shaft when a primary bearing system supports the shaft, and wherein the sleeve engages and rotates with the shaft when the primary bearing system does not support the shaft;
a bearing mount through which the shaft extends, the bearing mount defining an inside surface;
a plurality of oil seals adapted to sealingly engage the shaft, the plurality of oil seals comprising:
a first pair of oil seals disposed within the bearing mount and extending radially inward from the inside surface of the bearing mount, the first slinger being axially positioned between the first pair of oil seals; and
a second pair of oil seals disposed within the bearing mount and extending radially inward from the inside surface of the bearing mount, the second slinger being axially positioned between the second pair of oil seals; and
an oil ring extending circumferentially around the sleeve and rotating in response to the rotating sleeve when the sleeve engages and rotates with the shaft, wherein the rotating oil ring distributes lubricant within the auxiliary bearing system.

2. The auxiliary bearing system of claim 1, further comprising:
a reservoir formed in the bearing mount in which the lubricant is contained, wherein the oil ring contacts the lubricant in the reservoir.

3. The auxiliary bearing system of claim 2, further comprising:
a plurality of drain passages formed in the bearing mount through which the lubricant drains back into the reservoir after being distributed, a first drain passage of the plurality of drain passages being positioned between the first pair of oil seals and a second drain passage of the plurality of drain passages being positioned between the second pair of oil seals.

4. The auxiliary bearing system of claim 2, further comprising:
a cartridge flexibly mounted to the bearing mount; and
a plurality of bearings mounted within the cartridge and extending circumferentially around the sleeve, wherein each of the bearings is adapted to support a radial load.

5. The auxiliary bearing system of claim 4, wherein the oil ring is positioned axially between one of the plurality of bearings and one of the plurality of oil seals.

6. The auxiliary bearing system of claim 4, wherein the oil ring is positioned axially between two of the plurality of bearings.

7. The auxiliary bearing system of claim 4, further comprising:
a first annular ring and a second annular ring coupled to the bearing mount and between which the cartridge is disposed, each of the first annular ring and the second annular ring being adapted to support an axial load.

8. The auxiliary bearing system of claim 1, further comprising:
a ring guide extending circumferentially around the sleeve, wherein the oil ring extends circumferentially around the ring guide.

9. A method of supporting a shaft, the method comprising:
rotating a shaft, the shaft comprising a first slinger and a second slinger distal from the first slinger;
supporting the shaft with a primary bearing system during normal operation; and
supporting the shaft with an auxiliary bearing system when the primary bearing system is not supporting the shaft, the auxiliary bearing system comprising a bearing mount, the step of supporting the shaft with the auxiliary bearing system comprising:
 engaging the shaft with a sleeve disposed circumferentially around the shaft;
 rotating the sleeve in response to the rotating shaft;
 rotating an oil ring in response to the rotating sleeve, the oil ring being disposed circumferentially around the sleeve;
 collecting lubricant from a reservoir with the rotating oil ring;
 distributing the lubricant within the auxiliary bearing system with the rotating oil ring; and
 sealing the distributed lubricant within the auxiliary bearing system via a plurality of oil seals adapted to sealingly engage the shaft, the plurality of oil seals comprising:
  a first pair of oil seals disposed within the bearing mount and extending radially inward from an inside surface defined by the bearing mount, the first slinger being axially positioned between the first pair of oil seals; and
  a second pair of oil seals disposed within the bearing mount and extending radially inward from the inside surface of the bearing mount, the second slinger being axially positioned between the second pair of oil seals.

10. The method of claim 9, wherein the primary bearing system comprises a magnetic bearing system, and wherein supporting the shaft with the primary bearing system comprises:
levitating the shaft, relative to the sleeve, with the magnetic bearing system.

11. The method of claim 9, further comprising:
draining the lubricant back into the reservoir after distributing the lubricant within the auxiliary bearing system.

12. The method of claim 9, wherein supporting the shaft with the auxiliary bearing system further comprises:
supporting a radial load with at least one bearing, wherein the at least one bearing extends circumferentially around the sleeve.

13. The method of claim 12, wherein the at least one bearing is mounted in a cartridge and the cartridge is disposed between a first annular ring and a second annular ring, and wherein supporting the shaft with the auxiliary bearing system further comprises:
supporting an axial load with at least one of the first annular ring and the second annular rings.

14. A rotor system, comprising:
a rotating shaft having a first slinger and a second slinger distal from the first slinger;
a first bearing system configured to support the shaft during normal operation of the rotor system; and
a second bearing system configured to support the shaft when the first bearing system is not supporting the shaft, the second bearing system comprising:
 a sleeve through which the shaft extends, wherein a gap is defined between the sleeve and the shaft when the first bearing system supports the shaft, and wherein the sleeve engage and rotates with the rotating shaft when the second bearing system supports the shaft;
 an oil ring extending circumferentially around the sleeve and the shaft, the oil ring configured to rotate in response to the rotation of the sleeve;
 a lubricant-containing reservoir disposed below the shaft, wherein the oil ring is in contact with the lubricant in the reservoir and distributes the lubricant within the second bearing system when the oil ring rotates, thereby lubricating and cooling the second bearing system;
 a bearing mount in which the reservoir is formed and through which the shaft extends, the bearing mount defining an inside surface; and
 a plurality of oil seals adapted to sealingly engage the shaft, the plurality of oil seals comprising:
  a first pair of oil seals disposed within the bearing mount and extending radially inward from the inside surface of the bearing mount, the first slinger being axially positioned between the first pair of oil seals; and
  a second pair of oil seals disposed within the bearing mount and extending radially inward from the inside surface of the bearing mount, the second slinger being axially positioned between the second pair of oil seals.

15. The rotor system of claim 14, wherein the shaft rotates and the sleeve and the oil ring are generally stationary when the first bearing system supports the shaft.

16. The rotor system of claim 15, wherein the first bearing system comprises a magnetic bearing system.

17. The rotor system of claim 14, wherein the second bearing system further comprises:
a plurality of drain passages formed in the bearing mount and through which the lubricant drains back into the reservoir after being distributed.

18. The rotor system of claim 17, wherein the second bearing system further comprises:
a ring guide on which the oil ring is positioned, the ring guide extending circumferentially around the sleeve and the shaft;
a cartridge flexibly mounted to the bearing mount; and
a plurality of bearings mounted within the cartridge and extending circumferentially around the sleeve, each of the bearings being adapted to support a radial load.

19. The rotor system of claim 18, wherein the second bearing system further comprises:
a first shoulder and a second shoulder extending radially outward from the shaft and between which the sleeve is positioned; and
a first annular ring and a second annular ring coupled to the bearing mount and between which the cartridge is disposed;
wherein one or more of the first shoulder and the second shoulder and the first annular ring and the second annular ring are adapted to support an axial load.

20. The rotor system of claim 14, wherein the first bearing system comprises a magnetic bearing system, and wherein the second bearing system further comprises:
a ring guide on which the oil ring is positioned, the ring guide extending circumferentially around the sleeve and the shaft;
a plurality of drain passages formed in the bearing mount and via which the lubricant drains back into the reservoir after being distributed;
a cartridge flexibly mounted to the bearing mount; and
a plurality of bearings mounted within the cartridge and extending circumferentially around the sleeve.

* * * * *